W. G. COLLINS.
END-GATE ROD FOR VEHICLES.
No. 194,295. Patented Aug. 21, 1877.
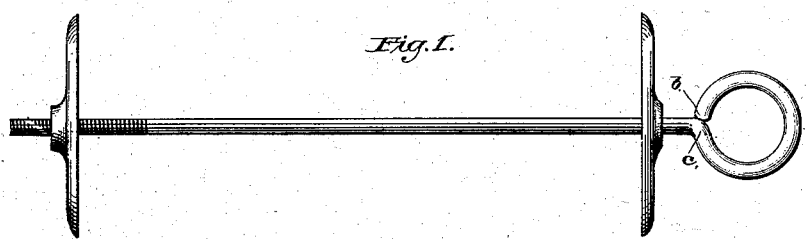
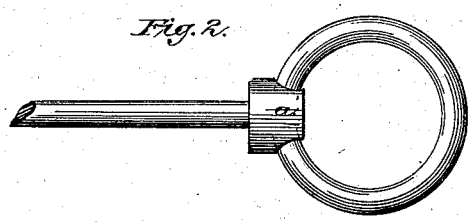
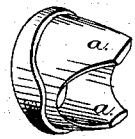
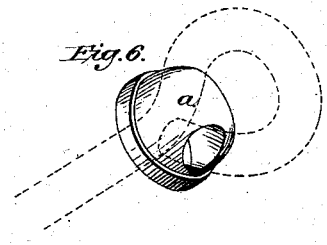
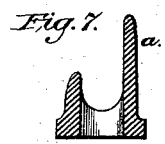
Attest:
M. J. Hanrick
S. E. Brown
Inventor:
William G. Collins.

UNITED STATES PATENT OFFICE.

WILLIAM G. COLLINS, OF CLEVELAND, OHIO.

IMPROVEMENT IN END-GATE RODS FOR VEHICLES.

Specification forming part of Letters Patent No. 194,295, dated August 21, 1877; application filed January 22, 1877.

*To all whom it may concern:*

Be it known that I, WILLIAM G. COLLINS, of Cleveland, in the county of Cuyahoga and State of Ohio, have invented certain new and useful Improvements in End-Gate Rods for Vehicles; and I do hereby declare that the following is a full, clear, and exact description thereof, which will enable others skilled in the art to which it appertains to make and use the same, reference being had to the accompanying drawings, and to the letters of reference marked thereon, which form a part of this specification, in which—

Figure 1 is a side view of an ordinary end-gate rod. Fig. 2 is an enlarged side view of one end of the same, provided with my improvement. Fig. 3 is a perspective view of my improved washer before putting on the rod. Figs. 4 and 5 are sectional views of same. Figs. 6 and 7 are perspective views of modifications of my improvement.

In wagon-box rods employed to hold the end gates in place a ring or eye is commonly bent on the end of the rod, a washer is fastened onto the box, and the rod passes through it.

By my improvement I provide a rod for such purposes, with a second and novel shaped washer at the base of, and locking into, such eye or ring, by means of which I secure a more even bearing or joint of rod and the washer fastened on the box.

I make my improved washer of malleable iron, in the well-known ways, and of the form shown in the Figs. 3, 4, and 5—that is, nearly circular at the base, a circular hole through the center corresponding in size with the rod, two ears extending at right angles to the base, one from each of two opposite sides, and of internal configuration to fit around the base of the eye of the rod.

In using my improved washer I first make the rod in the usual way, as shown in Fig. 1, and then slip the washer on over the end opposite to the eye or ring, and up to the base of the eye, with the ears *a a*, Fig. 3, at either side of the eye. I then, with a proper hammer or tool, close the ears over toward each other into the eye, and closely and firmly against the inner portion of the eye at its junction with the straight portion of the rod, as shown in Fig. 2, thus fastening it in place, so as not to be lost off.

My improvement also effects another advantage, namely, the preventing of the twisting away, when the rod does not turn readily, of the loose portion of the eye marked *b*, Fig. 1, from its position abutting against the solid portion of the eye where it merges into the straight portion of the rod at the point marked *c*, Fig. 1. Experience proves that my improvement entirely overcomes this fault.

It is evident that the advantages of my improvement may be secured by a slight modification, namely, the making of the two ears or clasps *a a* with their loose ends united, so to constitute an arch or loop, into which the loose end of the eye or ring, having previously been left slightly apart from the point *b*, Fig. 1, could be bent or inserted, as shown in Fig. 6.

It is also obvious that one larger ear extending from one side only, as shown in Fig. 7, and closing over the base of the eye, would accomplish, though less effectually, the same desired results.

In using this my improved washer it is not necessary to use nearly so heavy a washer fastened upon the wagon-box.

I am aware that shoulders or rings have heretofore been formed or welded upon wagon-box rods at the base of the eye, but such process is expensive, and results in more or less injury to the metal at that point.

Having thus fully described my invention, what I desire to secure by Letters Patent is—

An end-gate-rod washer, having a clasp or clasps, *a a*, substantially as and for the purposes set forth.

In testimony whereof I have hereunto set my hand.

WILLIAM G. COLLINS.

Witnesses:
  M. T. HERRICK,
  S. E. BROWN.